United States Patent [19]

Aubrey

[11] Patent Number: 4,978,452
[45] Date of Patent: Dec. 18, 1990

[54] METHOD FOR PRODUCING WAX IMPREGNATED FILTERS FOR INVESTMENT CASTING APPLICATIONS

[75] Inventor: Leonard S. Aubrey, Arden, N.C.

[73] Assignee: Alusuisse-Lonza Services Ltd., Zurich, Switzerland

[21] Appl. No.: 351,589

[22] Filed: May 15, 1989

[51] Int. Cl.⁵ .............................................. B01D 39/20
[52] U.S. Cl. .................................. 210/510.1; 29/424; 164/134; 164/137; 75/407; 266/227
[58] Field of Search .............. 210/510.1; 164/35, 134, 164/137, 358; 29/423, 424; 266/227; 75/407–412

[56] References Cited

U.S. PATENT DOCUMENTS 4,591,383 5/1986 McGarrey et al. .............. 210/510.1
4,811,778 3/1989 Allen et al. ............................ 29/424

Primary Examiner—W. Gary Jones
Attorney, Agent, or Firm—Bachman & LaPointe

[57] ABSTRACT

The present invention relates to wax impregnated filters for use in investment casting applications and a method for forming them. The filters are characterized by a wax impregnated ceramic substrate, wax layers bonded to two opposed surfaces of the substrate, and peripheral edges having exposed ceramic surfaces which can be adhered to the ceramic liner of an investment casting apparatus. The method comprises providing a sheet of ceramic foam filter material, impregnating the sheet with sufficient liquid wax to form a wax layer of desired thickness bonded to each of two opposed surfaces of the sheet, allowing the wax to solidify, and precision cutting the impregnated sheet into filters having a desired set of dimensions. The method further comprises exposing the peripheral edges of each filter to allow the ceramic shell building or liner in the investment casting apparatus to bond directly to the filter.

11 Claims, 1 Drawing Sheet

METHOD FOR PRODUCING WAX IMPREGNATED FILTERS FOR INVESTMENT CASTING APPLICATIONS

BACKGROUND OF THE INVENTION

The present invention relates to wax impregnated filters for use in investment casting apparatus and an improved method for producing the filters.

The investment casting industry represents a significant market for ceramic foam filters due to high metallurgical standards (dye penetrant, magnetic particle, visual and radiographic). In a high percentage of investment casting applications, a filter is installed into a bottom-pour gating system during the wax tree assembly process. This method of gating incorporating the filter results in a quiet and non-turbulent mold filling with minimal splashing of the pouring stream and hence minimal chances for possible reoxidation after the filter. The installation of the filter into a bottom-pour gating system, however, requires a significant amount of costly preparation work to be performed on the filter.

The filter must be impregnated or coated with sprue wax in order to prevent the penetratiOn of dipping slurries into the filter structure during the shell building process. In addition, two blocks of sprue wax typically must be attached to the entrance and exit faces of the filter. These blocks of wax serve three functions: (1) mechanically retaining the filter in the gating system after autoclaving to remove the sprue and pattern wax; (2) providing an expansion in the gating system to accommodate the increased filter area required to maintain metal flow; and (3) providing surfaces to attach the wax filter assembly to the bottom pour gating system.

Three methods of filter impregnation are currently used commercially. The first is a ceramic border technique involving the application of a colloidal silica bonded fused silica border to the edge(s) of the filter body. Following air drying, the body of the filter is manually impregnated with wax. Blocks of wax are then attached to each face of the filter. The filter/wax assembly is thereafter dipped in a sealing wax, taking care not to completely coat the ceramic filter border, in order to fill the re-entrant gap where the filter border and wax blocks meet. The advantage of this method is that the filter border is bonded directly onto the shell during the shell building process. As a result of this, the filter cannot rattle in the shell and possibly chip and introduce filter material into the mold cavity. In addition, there is no gap between the filter structure and the shell wall. Thus, molten metal bypass around the edges of the filter is effectively negated. The disadvantage of this method is that it is very labor intensive and costly.

A second method involves preparing a die cavity into which the pre-cut sized filter is inserted. The filter is impregnated with wax by either pouring or injecting wax into the die cavity. Wax attachment blocks may be incorporated into the die cavity. The major disadvantage is that the filter is usually loose in the shell after wax removal in the autoclave. This is due to variations in the filter dimensions which dictate that the die cavity be oversized. The loose filter is troublesome in that it can rattle and possibly chip causing loose filter material to be introduced into the mold cavity as inclusion material. Because of the gap, molten metal can bypass around the edge of the filter.

The third method involves wrapping the filter with sheet wax, sealing with a hot knife, and attaching two blocks of wax to each face of the filter. The disadvantage of this method is that after autoclaving the filter is loose in the shell due to the gap created when the sheet wax is removed. Once again, the filter can rattle and chip and molten metal can bypass around the edges of the filters through the gap created when the wax sheet is removed. This method of filter encapsulation is also labor intensive and costly.

Accordingly, it is an object of the present invention to provide filters pre-impregnated with sprue wax and ready for installation or use by a foundry in investment casting apparatus.

It is a further object of the present invention to proved an improved method for producing the above filters.

It is still a further object of the present invention to provide a method as above which produces the filters inexpensively.

It is yet a further object of the present invention to provide a method as above which produces filters having improved dimensional tolerances.

These and other objects and advantages will become more apparent from the following description and drawings in which like reference numerals depict like elements.

SUMMARY OF THE INVENTION

The foregoing objects and advantages are achieved by the following method for producing wax impregnated filters for investment casting applications characterized by a wax impregnated ceramic substrate, wax layers bonded to two opposed surfaces of the substrate and peripheral edges on the substrate having exposed ceramic surfaces which can be adhered to the ceramic shell of an investment casting apparatus. The method comprises providing a sheet of ceramic foam filter material, impregnating the sheet with sufficient liquid wax to form a wax layer of desired thickness bonded to each of two opposed surfaces of the sheet, allowing the wax to solidify, and precision cutting the impregnated sheet into filters having a desired set of dimensions. The method further comprises exposing the peripheral edges of each filter to allow the ceramic shell building or liner in an investment casting apparatus to bond directly to the filter.

It has been found that the method of the present invention provides the following advantages over the aforementioned prior methods for forming investment casting filters. First, the instant method enables filters to be cut to very close tolerances, thus providing filters with improved dimensional control. Second, the need for expensive, single piece wax injection dies is eliminated and further reductions in manufacturing costs are achieved through the production of a single large filter rather than numerous smaller filters. Third, exposure of the underlying filter peripheral edges to allow the shell material of the investment casting apparatus to adhere to the filter edges without applying a ceramic border provides a filter assembly which is firmly in place at all times, thus avoiding the prior art problems associated with loose filters in the assembly. Fourth, problems associated with molten metal bypass around the filter are substantially eliminated. Fifth, nearly 100% of the available filter area is utilized in filters produced in accordance with the method of the present invention.

DETAILED DESCRIPTION OF THE INVENTION

As previously discussed, ceramic foam filters are employed in investment casting equipment to meet the high metallurgical cleanliness standards necessary to produce near net shaped castings.

Figure 1:
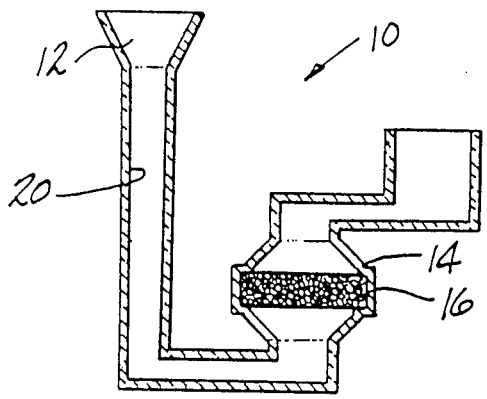
FIG. 1 is a schematic illustration of an investment casting apparatus having a bottom pour gating arrangement.

It is preferred in this type of casting that the ceramic foam filters be utilized in a bottom pour gating arrangement such as that schematically illustrated in FIG. 1. The gating arrangement 10 includes a pouring cup 12, into which the molten metal is poured, a filter chamber 14, and a filter structure 16. The arrangement further includes a ceramic shell 20 such as that shown in FIG. 2.

In these systems, it is not recommended that the filters be inserted in the pouring cup where the molten metal is poured directly onto the filter structure. Pouring directly onto the filter structure can result in entrained air in the pouring stream and large oxide films being drawn into the filter structure—causing premature filter blockage and poor filtration efficiency. Direct pouring onto the filter structure can also result in channeling of the flow through the filter structure, reducing filtration efficiency. In air casting operations, the stream at the filter exit may not reconverge, resulting in severe oxidation.

Figure 2:
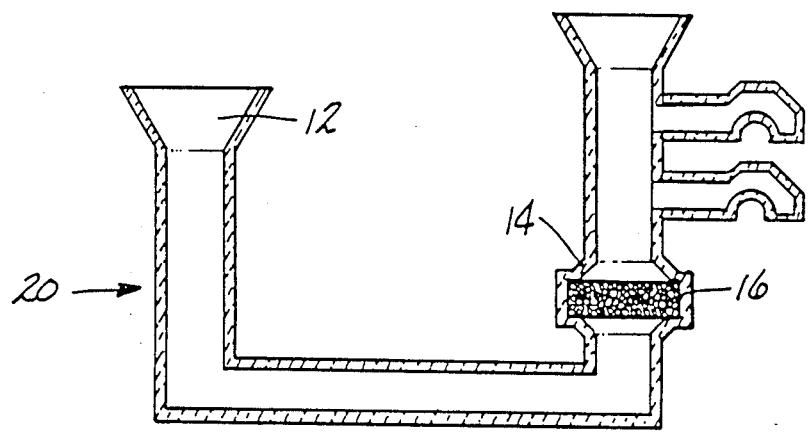
FIG. 2 is a cross sectional view of a ceramic shell employed in an investment casting apparatus.

As shown in FIG. 2, the investment casting apparatus gating system typically includes a ceramic shell liner 20 through which the molten metal is poured. A ceramic foam filter 16 in accordance with the present invention for removing impurities and/or inclusions is located within a filter chamber 14 in the shell.

The shell 20 is generally formed by dipping a waxed pre-form not shown into a ceramic slurry. The filter structure 16 within the shell 20 is impregnated with wax to prevent the penetration of the dipping slurry into the filter structure during the shell building process. After the dipping process is completed autoclaving is typically used to remove wax from the shell. The ceramic material with the filter structure in place is then fired to form the desired refractory shell.

Figure 3:
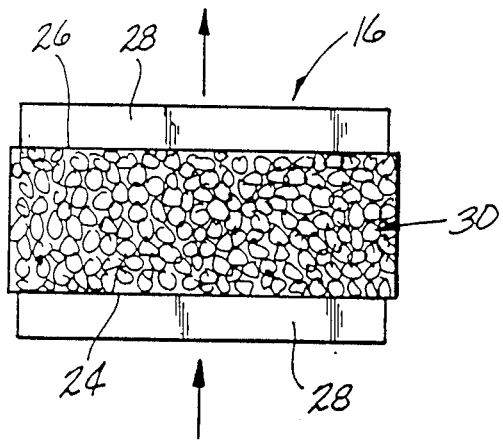
FIG. 3 is a side view of a filter wax/blank composite formed by the method of the present invention.
Figure 4:
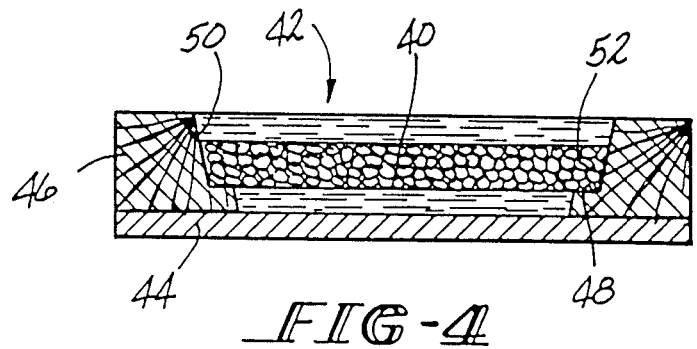
FIG. 4 is a sectional view of a die employed in the method of the present invention.

The filters formed by the method of the present invention as shown in FIG. 3 are characterized by the following features. First, the filter entrance and exit faces, 24 and 26 respectively, each have a layer 28 of wax material bonded thereto. Typically, this layer is about 0.5 inches thick. The layers 28 serve three functions. First, they mechanically retain the filter in the gating system 10 after autoclaving to remove the pattern wax associated with the pre-form used to form the shell by allowing the ceramic liner to grip the filter structure substantially without gaps. Second, they provide an expansion in the gating system to accommodate the increased filter area required to maintain metal flow. Third, they provide surfaces to attach the wax filter assembly to the bottom pour gating system.

The filters are further characterized by peripheral edges 30 having exposed areas of ceramic material. This feature is particularly important in that it enables the ceramic shell material 20 to be directly bonded to the edges of the filter structure. As a result, the filter 16 is not loose within the shell 20. Thus, it can not rattle or chip and introduce loose filter material into the mold cavity as inclusion material. Still further, molten metal can not bypass around the filter edges.

The filter structures 16 are formed by placing a large sheet or blank of ceramic foam filter material 40 such as a 17"×17" piece of material into a specially designed die cavity 42. The ceramic foam filter material 40 may be formed from any suitable material such as phosphate bonded alumina, silicon carbide sintered alumina, or zirconia-alumina. The die cavity preferably comprises an aluminum base plate 44 and a wooden frame portion 46 in a preferred embodiment. The frame portion is aluminum. If desired, the frame may have a lip portion 48 on which the filter material 40 can be seated and angled surfaces 50 to provide draft to remove the wax/filter assembly after solidifying and to accommodate a filter material having bevelled edges 52.

After the filter material 40 is seated within the die cavity 42, it is pre-impregnated with wax. This is done by filling the cavity with liquid wax. A suitable investment casting wax known in the art which melts at a lower melting point than the pattern material may be used. The lower melting point is important so that one is able to get the wax out of the sprue first. A particularly useful wax is one manufactured by the Kindt-Collins Company and sold under the name #9 Red wax. The wax has a softening point of approximately 146° F. and an ash content of 0.003%. In a preferred method, the cavity 42 is filled with sufficient wax so that there is approximately ½" of wax on both sides of the filter material. This extra material is provided to form the subsequent filter expansion required for the application. An alternative method is to place 2 wax chills or sheets (17"×17"×½") on each side of the filter sheet (40) and subsequently infiltrating the porous filter structure (40) with liquid wax under pressure.

After the wax has solidified, the filter blank/wax composite is cut into smaller sized filters pieces having a desired set of dimensions required for the final application. For example, the blank/wax composite may be cut into 2"×2", 2"×3", or 3"×4" pieces using a diamond saw having dimensional cutting capabilities of approximately ±0.005 inches, or any other defined method. As previously discussed, forming the filters in this manner provides improved dimensional control and significant cost reductions.

After cutting, a final edge treatment is given to the filter to expose the peripheral edges and the underlying ceramic material. This edge treatment comprises subjecting each filter edge 30 to a heat treatment at approximately 120°-160° C. to melt away a layer of wax of approximately 1 mm to 3 mm along the edges. The heat treatment may comprise placing each edge 30 on a hot plate not shown for a period of a few seconds. As previously discussed, it is possible by exposing the underlying filter material to directly bond the ceramic shell 20 to the filter structure 22 and thus prevent the filter from being loose in shell.

The provision of a pre-impregnated filter in accordance with the present invention which is ready for installation or use by a foundry provides the following additional advantages:

(1) Reduced cost to the foundry since a pre-impregnated filter is provided at a total cost lower than if the foundry purchased the filter separately and prepared the filter in house;

(2) Pre-impregnating the filters reduces the purchase lead time required to prepare the filter since it would arrive ready to use;

(3) Simplify application of the filter since the preparation work does not require scheduling and supervision. In addition manpower and capital equipment is not diverted away from mainstream business in order to prepare filter;

(4) Eliminate damage to the filter due to inadequate packing, shipping damage, or by normal handling; and (5) Increased ease of application.

Filters produced in accordance with the present invention have been found to work with a wide range of materials. For example, they may be used in conjunction with the filtration and casting of aluminum, copper-base metals and alloys, cobalt-base metals and alloys, nickel-base metals and alloys, steels, stainless steels, tool steels, an other iron-based metals and alloys.

It is apparent that there has been provided in accordance with this invention a method for producing wax impregnated filters for investment casting applications which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for producing a wax impregnated filter structure having improved dimensional tolerance for investment casting applications which comprises:
   providing a blank sheet of ceramic foam filter material;
   impregnating said filter material with liquid wax;
   allowing said wax to solidify; and
   forming a wax impregnated filter structure having peripheral edges with exposed ceramic surfaces by precision cutting said pre-impregnated sheet into at least one filter having a desired set of dimensions, whereby said peripheral edges allow said filter structure to adhere to a ceramic shell building in an investment casting apparatus.

2. A method according to claim 1 wherein said impregnating step comprises:
   placing said sheet of filter material in a die cavity: and substantially filling said cavity with said liquid wax.

3. A method according to claim 2 wherein said filling step comprises filling said cavity with enough wax so that there is approximately 0.5 inches of said wax above and below said sheet of filter material.

4. A method according to claim 1 wherein said precision cutting step comprises cutting said blank material with a diamond saw having dimensional cutting capabilities of approximately ±0.005 inches.

5. A method for producing a wax impregnated filter structure having improved dimensional tolerance for investment casting applications which comprises:
   providing a blank sheet of ceramic foam filter material;
   impregnating said filter material with liquid wax;
   allowing said wax to solidify;
   precision cutting said pre-impregnated sheet into at least one filter having a desired set of dimensions;
   exposing peripheral edges of each said filter to allow said filter to adhere to a ceramic shell building in an investment casting apparatus; and
   said exposing step further comprising applying a heat treatment to each said peripheral edge to melt away wax covering said edge and to thereby expose the underlying filter structure.

6. A method according to claim 5 wherein said heat treatment melts away from about 1 mm to about 3 mm of wax covering each edge.

7. A filter blank/wax composite for use in an investment casting apparatus having a ceramic shell which comprises:
   a porous ceramic substrate impregnated with wax;
   said substrate having an entrance face through which molten metal can enter the substrate, an exit face through which said molten metal in a filtered state can exit said substrate, and integral peripheral edges;
   said entrance and exit faces each having a layer of wax bonded thereto; and
   said integral peripheral edges being substantially wax-free and having exposed ceramic surfaces which can be bonded directly to said ceramic shell.

8. A filter blank/wax composite according to claim 7 wherein each said wax layer has a thickness of approximately 0.5 inches.

9. An apparatus for the investment casting of metal components which comprises:
   a ceramic shell liner through which molten metal flows;
   said liner having a filter chamber;
   a filter structure within said chamber, said filter structure comprising a ceramic substrate having a layer of wax material bonded to two opposed surfaces and peripheral edges with the underlying ceramic material in an exposed condition; and
   said filter structure being bonded to said ceramic shell liner by at least one of the exposed peripheral edges.

10. An apparatus according to claim 9 wherein said wax layers mechanically retain the filter structure within said chamber and provide an expansion to accommodate the increased filter area required to maintain flow.

11. A filter blank/wax composite for use in an investment casting apparatus having a ceramic shell which comprises:
   a porous ceramic substrate impregnated with wax;
   said substrate having an entrance face through which molten metal can enter the substrate, and exit face through which said molten metal in a filtered state can exit said substrate, and peripheral edges;
   said entrance and exit faces each having a layer of wax bonded thereto;
   and said peripheral edges being substantially wax free and having exposed ceramic surfaces for facilitating bonding of said surfaces to said ceramic shell without the need to apply a ceramic border.

* * * * *